United States Patent [19]

Terpay

[11] E Re. 31,252

[45] Reissued May 24, 1983

[54] PRESSURE-SENSITIVE FLOCKED FASTENER AND METHOD OF MAKING SAME

[75] Inventor: John M. Terpay, Danville, Va.

[73] Assignee: Reeves Brothers, Inc., Spartanburg, S.C.

[21] Appl. No.: 401,019

[22] Filed: Jul. 22, 1982

Related U.S. Patent Documents

Reissue of:

[64] Patent No.: 4,282,051
Issued: Aug. 4, 1981
Appl. No.: 127,858
Filed: Mar. 6, 1980

[51] Int. Cl.[3] ..... E04B 2/00

[52] U.S. Cl. ..... 156/71; 156/72; 428/62; 428/86; 428/90; 428/97; 428/354; 428/355

[58] Field of Search ..... 428/62, 86, 90, 96, 428/97, 354, 355; 156/71, 72

[56] References Cited

U.S. PATENT DOCUMENTS

| | | | |
|---|---|---|---|
| 3,591,444 | 7/1971 | Hoppe | 428/90 |
| 3,940,524 | 2/1976 | Hoppe | 428/90 |
| 4,142,929 | 3/1979 | Otomine | 428/90 |
| 4,282,051 | 8/1981 | Terpay | 428/90 |

*Primary Examiner*—Marion McCamish
*Attorney, Agent, or Firm*—Fisher, Christen & Sabol

[57] ABSTRACT

A latent pressure-sensitive fastener having a discontinuous surface is made by spraying an aqueous pressure-sensitive adhesive onto a flocked pile surface which is adhered to a substrate by a permanent adhesive. The flocked pile surface serves as a reservoir for the pressure-sensitive adhesive. The pressure-sensitive adhesive is wicked towards the face of the flocked pile surface upon face-to-face mating of two fasteners. The reservoir of pressure-sensitive adhesive and the wicking action enables repeated fastening and unfastening of two mated fasteners without loss of locking power. The fasteners are particularly useful for seaming carpets.

20 Claims, 3 Drawing Figures

PRESSURE-SENSITIVE FLOCKED FASTENER AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a pressure-sensitive fastener which can be repeatedly fastened and unfastened, without loss of locking power. This invention also relates to both a method of making the pressure-sensitive fastener and to a method of seaming carpets using the pressure-sensitive fastener.

2. Description of the Prior Art

The seaming of carpets by sewing the two pieces together is well-known. The method however, is labor-intensive and rather time-consuming. Also known in the art for the seaming of carpets are heat-sensitive polymer-containing tapes. The two pieces of carpet are butted together, the heat-sensitive tape is applied in the lengthwise direction of the seam so as to overlap the two pieces of carpet and then heat is applied to the tape by means of an iron or the like. The polymeric component of the tape melts and infuses into the carpet backing. Upon cooling, the polymeric component hardens and adheres to the carpet. However, the need to heat the tape presents the risk of overheating and damaging the carpet. Moreover, in both the sewing and heat-sensitive tape methods, the correction of errors due to misalignment of the edges of the carpet to be seamed would require considerable time in both undoing the seamed portion and in redoing of the seam.

Similar problems in correcting misalignment errors are encountered in the conventional methods for the laying of carpets. Conventionally, carpet is laid by tacking the carpet perimeter to a wood strip by means of staples, nails, or the like or to a metal strip having prong-like elements attached thereto. Once tacking of a carpet has begun by these methods, unfastening of the carpet to correct errors is difficult and often results in damage to the carpet. Another means for the laying of carpet is carpet tape having a pressure-sensitive adhesive on both sides of the tape. However, these conventional pressure-sensitive adhesive tapes suffer a severe loss of adhering ability when separated from the floor or carpet to correct an error.

According to the present invention, there is provided a pressure-sensitive fastener which can be repeatedly fastened and unfastened without loss of locking, or holding power. It is imminently suitable for the seaming and laying of soft and hard surface flooring because either task can be accomplished quickly and moreover misalignment errors can be readily corrected.

SUMMARY OF THE INVENTION

The present invention relates to a latent pressure-sensitive fastener whose fastening ability depends upon the face-to-face mating of two pile surfaces. The face-to-face pile surface has both a mechanical and a chemical fastening ability. The fastener comprises a flocked pile surface adhered to a base material by a permanent adhesive, and a reservoir of aqueous pressure-sensitive adhesive adhering to and between the fibers forming the flocked pile surface. Mechanical fastening ability is provided by the intermeshing of the fibers forming the flocked pile surface. Chemical fastening ability is provided by the pressure-sensitive adhesive. The flocked pile surface increases the surface area for holding pressure-sensitive adhesive over the surface area of conventional, flat, pressure-sensitive adhesive tapes. The pressure-sensitive adhesive is absorbed into the fibers of the flocked pile surface and is also retained between the fibers. The pile surface therefore functions as a reservoir and as a wick for the pressure-sensitive adhesive. The face-to-face mating of the pile surface draws on the stored supply of adhesive. The face of the pile surface is mildly tacky to the hand. However, when mated face-to-face it adheres with great shear strength. The mated fasteners can be peeled apart repeatedly and reused without losing their adhering ability as opposed to a conventional pressure-sensitive tape. The pressure-sensitive adhesive is applied to the flocked pile surface so as not to form a film of pressure-sensitive adhesive on the flocked pile fibers. The fastener must have a discontinuous surface so as to increase the surface area available for mating.

To obtain the desired discontinuous surface, the pressure-sensitive adhesive must be sprayed onto the flocked pile surface. Doctoring on the pressure-sensitive adhesive, for example with a roller, flattens the fibers and results in a continuous surface. According to the present invention, a base material is coated with a permanent adhesive. Then, the permanent adhesive-coated base material is flocked with pile fibers and the permanent adhesive is cured by heating to secure the pile fibers to the base material. The cured flock-coated base material is then sprayed with the aqueous pressure-sensitive adhesive in an amount which does not flood the spaces between the fibers and which does not form a continuous film on the flocked pile surface. The spray-coated cured flock material is then dried and wound into a roll.

The novel pressure-sensitive fasteners of the present invention are of particular utility for seaming and laying of soft and hard floor coverings.

BRIEF DESCRIPTION OF THE DRAWINGS

The invention is illustrated in the accompanying drawings wherein.

DETAILED DESCRIPTION OF THE INVENTION

Figure 1:
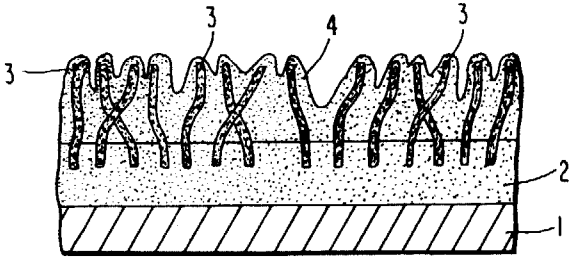
FIG. 1 shows a magnified pressure-sensitive fastener according to the present invention.

The pressure-sensitive fasteners of the present invention have a discontinuous surface as illustrated in FIG. 1. The pressure-sensitive fastener comprises a base material or substrate (1) which is coated with a permanent adhesive (2). Flock fibers (3) are adhered to the base material (1) by means of the permanent adhesive (2). Adhering to and between the fibers (3) forming the flocked pile surface is a reservoir of aqueous pressure-sensitive adhesive (4).

By permanent adhesive is meant an adhesive which has sufficient adhesive strength to bond the flocked fibers (3) to the base material (1) under conditions which would be required to separate face-to-face mated fasteners. Suitable permanent adhesives are well-known in the art and do not form a part of the present invention. Adhesives known in the art as laminating adhesives and flocking adhesives are conventional adhesives which can be used in the practice of the present invention. The flocking adhesives include crosslinkable or self-crosslinking acrylic dispersion adhesives, polyvinylchloride plastisols, polyurethane systems, and solvent-based acrylic solutions. The preferred adhesives for use as the permanent adhesive (2) used in the fasteners of the present invention are aqueous dispersed self-crosslinking acrylic adhesives. Exemplary of the latter type of acrylic adhesives are Rhoplex HA-8, Rhoplex HA-24, Rhoplex E 32, Rhoplex E 358, Rhoplex E 269, and Rhoplex HA-12, all manufactured by Rohm & Haas. Other suitable adhesives are Plextol DV240, Plextol DV300, Plextol DV475 and Plextol DV410, all manufactured by Röhm GmbH. All of these adhesives as well as numerous other suitable adhesives for adhering the flocked pile fibers (3) to the base material (1) are disclosed in Handbook of Adhesives, 2nd edition, Skeist, Irving, editor, Van Nostrand Reinhold Company, publishers, pages 535 to 539 and 542–546 (1962). The cited portions of the handbook of adhesives are herein incorporated by reference in their entirety.

A pressure-sensitive adhesive is an adhesive which forms a permanently tacky film after the evaporation of the liquid phase or after cooling of a hot melt. Pressure-sensitive adhesives adhere tenaciously upon application with only light finger pressure. Various polymeric raw materials are used in the formulation of pressure-sensitive adhesives. Exemplary of the polymers used are natural rubber, polyisobutylene, polyvinyl ether, various types of synthetic rubber (such as styrenebutadiene copolymers), ethylene copolymers, vinyl polymers (such as polyvinylacetate, polyvinylalcohol, and acrylics), and polyurethanes. The preferred pressure-sensitive adhesives for use in the present invention are aqueous systems. Solvent-based adhesives are not desirable because they present a significant fire hazard, particularly during spraying of the adhesive onto the flocked pile surface.

The aqueous pressure-sensitive adhesives which are suitable for the purposes of the present invention are commerically available and do not form a part of the present invention. The preferred aqueous pressure-sensitive adhesives are aqueous dispersions of vinyl polymers such as the acrylics and polyvinylacetate. The vinyl polymers may be highly plasticized to obtain the necessary tackiness for a pressure-sensitive adhesive. The acrylic pressure-sensitive adhesives have excellent properties, such as aging resistance, light stability, good adhesion to various types of substrates, and ease of application. The acrylics typically contain acrylic esters with 4 or more carbon atoms in the alcohol component. The desired tack of these pressure-sensitive adhesives is attained primarily with N-butyl acrylate and/or 2-ethylhexyl acrylate. The conventional acrylate pressure-sensitive adhesives are normally copolymers of the higher alkyl acrylates with a small amount of a polar comonomer such as acrylic acid, acrylamide, maleic anhydride, diacetone acrylamide, and long chain alkyl acrylamides. Suitable, commercially available aqueous dispersed acrylic pressure-sensitive adhesives for use as the pressure-sensitive adhesive (4) in the present invention are Texicryl 13–439, Texicryl 13–441, and Texicryl 13–442 all manufactured by Scott Bader, Vantac 294, Vantac 315, Vantac 343, and Vantac 400 all manufactured by British Oxygen Chemicals, Ltd., and Mowilith DM56 and Mowilith DM45, all manufactured by Farbwerke Hoechst AG. All of these pressure-sensitive adhesives as well as other aqueous dispersed acrylic pressure-sensitive adhesive compositions which can be used in the present invention are disclosed in the Handbook of Adhesives, supra, at pages 535–539 which are herein incorporated by reference with regard to said compositions. A suitable commercially available aqueous dispersed polyvinylacetate pressure-sensitive adhesive for use in the present invention is Rubba's Poly-Stix 3731.

The base material (1) can be a woven or a nonwoven material. Exemplary of the materials suitable for forming the base material (1) for use in the present invention are polyethylene terephthalate film, cellulose film, cotton scrim, polyester-cotton scrim, viscose rayon cloth, and cotton cloth.

Suitable flocked pile fibers (3) are flocked viscose rayon fibers, cotton flock, polyester flock and mixtures thereof. The length of the flocked pile fibers should be between about 25 to 40 thousandths of an inch, preferably about 30 thousandths of an inch. The thickness of the flocked pile fibers (3) should be between about 2 denier to 5 denier, preferably about 3 denier. If the fibers are too long or too short the locking power and the duration of the locking power of the fasteners would both decrease. The longer the fiber, the thicker it must be for it to stand up and as a result, the fiber concentration is reduced. The lower the fiber concentration, the less the locking power because the surface area for absorbing the pressure-sensitive adhesive is reduced. The shorter the fibers at any given fiber concentration, the less the surface available for coating by the adhesive and consequently the less the volume of the pressure-sensitive adhesive effectively maintained between the fibers. In other words, the depth of the reservoir of pressure-sensitive adhesive must decrease as the fiber length decreases so as to maintain the required discontinuous surface.

Figure 2:
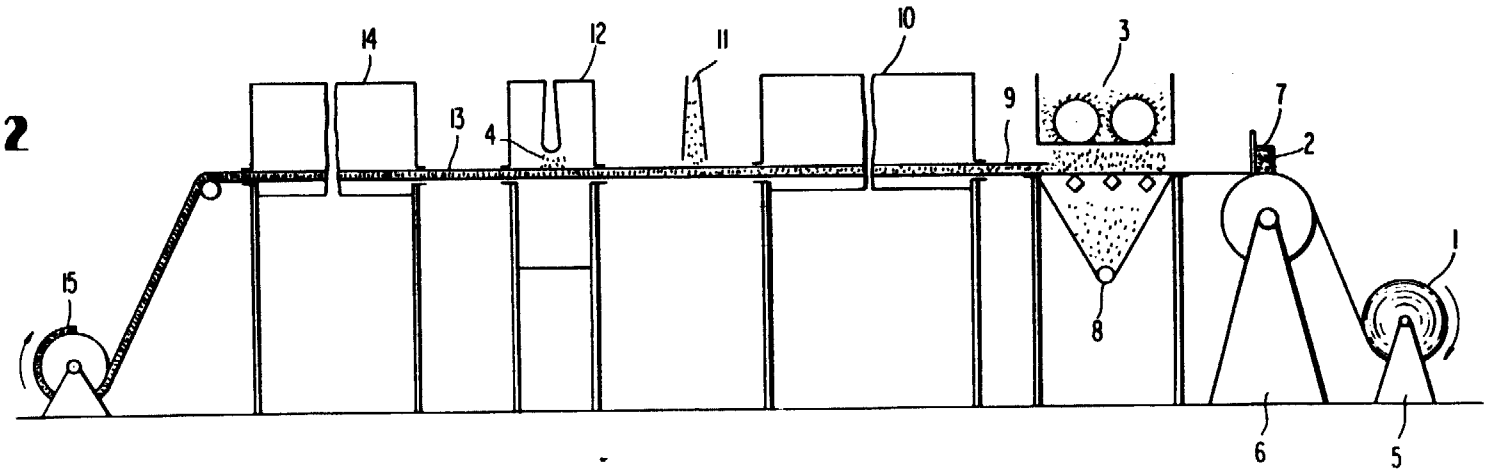
FIG. 2 shows apparatus for producing the pressure-sensitive fastener according to the present invention.

A method for making a pressure-sensitive fastener having a discontinuous surface in accordance with the present invention is illustrated in FIG. 2. As shown in FIG. 2 base material or substrate (1) is continuously fed from substrate holder (5) to adhesive coater (6) wherein it is coated with the permanent adhesive (2) which is supplied from permanent adhesive holder (7). The permanent adhesive-coated base material is then passed to flock coater (8) wherein flock fibers (3) are flocked onto the adhesive-coated base material to produce a flocked pile surface (9). The flock coater (8) may be a mechanical and/or electrical flocking machine which is conventional in the art. The permanent adhesive is then heat cured in curing oven (10) to secure the pile fibers to the base material. Suitable curing temperatures and times depend upon the permanent adhesive used and are ascertainable from the manufacturer's directions for using the adhesive. Typical curing temperatures are between about 250° F. to 325° F. Typical curing times are between about 1 minute to about 4 minutes. The cured product is then passed to vacuum (11) for removal of residual loose fibers. The vacuumed product is then passed to spray booth (12) where the aqueous pressure-sensitive adhesive (4) is sprayed onto the pile surface. The amount of aqueous pressure-sensitive adhesive applied to the flocked pile surface should be enough to form a reservoir of pressure-sensitive adhesive between the flocked fibers (3). However, the amount must not be so great as to flood the flocked pile surface and to create a film of pressure-sensitive adhesive on the flocked pile surface. The flocked pile surface after application of the pressure-sensitive adhesive must be discontinuous so as to increase the surface area available for mating of two fasteners. The spray-coated product (13) is then dried in drying oven (14) to remove water and other volatiles. The temperatures and times involved in the drying will depend upon the aqueous pressure-sensitive adhesive used. Typical drying temperatures are between about 225° F. to 275° F. Drying times typically range from about 30 seconds to 2 minutes. The dried final product is then wound onto take-up (15).

Figure 3:
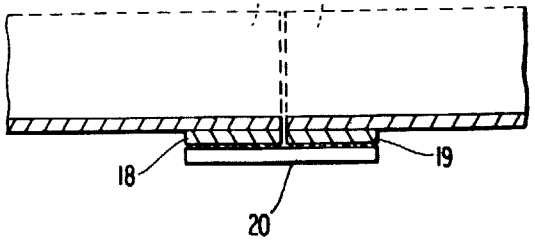
FIG. 3 shows two pieces of carpet which have been seamed together with the pressure-sensitive fastener of the present invention.

The seaming of two materials, according to the present invention is illustrated in FIG. 3. As shown in FIG. 3, two materials (16) and (17) are seamed together by applying pressure-sensitive fasteners (18) and (19) to the bottom and along the edge of each material to be seamed with, for example, a conventional building adhesive, discussed below. The flocked pile surface of a third pressure-sensitive fastener (20) is then bridged across and mated to the flocked pile surfaces of the other two pressure-sensitive fasteners (18) and (19).

The pressure-sensitive fastener of the present invention can be in the form of a tape or in the form of a roll of fabric several yards in width. To attach two materials together the pressure-sensitive fastener of the present invention is applied to one of said materials. A second pressure-sensitive fastener is applied to the other material and the flocked pile surfaces of the two pressure-sensitive fasteners are then contacted with slight finger pressure to adhere the two materials together. In this manner the pressure-sensitive fasteners of the present invention can be used to lay soft and hard surface flooring. In the latter application a first pressure-sensitive fastener is applied to the back of the material to be laid, such as the back of a carpet. Next, a pressure-sensitive fastener is adhered to the floor by means of a permanent adhesive such as those discussed above or by means of a building adhesive such as those discussed in The Handbook of Adhesives, supra, pages 546 to 548 (which pages are herein incorporated by reference in their entirety as they relate to building adhesives). Once the floor is prepared with the pressure-sensitive fastener of the present invention, the pressure-sensitive fastener attached to the floor covering is contacted therewith. In like manner, the pressure-sensitive fasteners of the present invention can be used to hang wall coverings, and on inter-office envelopes. In the latter application, the paper forming the envelope can serve as the base material (1) of the pressure-sensitive fastener.

The pressure-sensitive fasteners of the present invention can also be used without face-to-face mating with another pressure-sensitive fastener where high shear strength is not needed or where the material to be held is fibrous. Exemplary of such applications are attaching a pressure-sensitive fastener according to the present invention to a silk-screen table to prevent movement of solid fabric, towels, etc. during the printing process. Likewise, the pressure-sensitive fastener of the present invention can be attached to a roller for use as a lint brush, a glass sliver cleaner, and as a means for cleaning up spilled sugar, salt, and the like.

The following examples illustrate the method of making the pressure-sensitive fastener having a discontinuous surface according to the present invention.

EXAMPLE

A piece of woven viscose rayon fabric is knife-coated with Rhoplex E-32 (an aqueous dispersed acrylic adhesive manufactured by Rohm & Haas, having a solids content of 46 percent and a viscosity of 200 cps) thickened with any conventional thickening agent to a viscosity of about 50,000 cps. Then, viscose rayon pile fibers are electrically flocked onto the substrate bearing the adhesive coating. The pile fibers are then secured to the base by heat-curing the adhesive at 300° F. for 3 minutes. The final cured flock-coated material is then sprayed with Rubba's Poly-Stix 3731 (an aqueous dispersed polyvinylacetate pressure-sensitive adhesive) so as to provide a reservoir of pressure-sensitive adhesive adhering to and between the fibers forming the flocked pile surface so as not to form a continuous film on the flocked pile surface. The spray-coated, cured flock-coated base material is then heat dried at 250° F. for 1 minute to obtain a pressure-sensitive fastener having a discontinuous surface according to the present invention.

What is claimed:

1. A pressure-sensitive fastener having a discontinuous surface comprising a flocked pile surface adhered to a base material by a permanent adhesive, and a reservoir of [aqueous] pressure-sensitive adhesive adhering to and between the fibers forming said flocked pile surface.

2. A pressure-sensitive fastener as claimed in claim 1 wherein said [aqueous] pressure-sensitive adhesive is *derived from* an aqueous dispersed pressure-sensitive acrylic adhesive.

3. A pressure-sensitive fastener as claimed in claim 1 wherein the flock forming said flocked pile surface comprises at least one flock selected from the group consisting of cotton flock, polyester flock, and viscose rayon flock.

4. A pressure-sensitive fastener as claimed in claim 1 wherein the fibers forming said flocked pile surface have a thickness of about 2–5 deniers.

5. A pressure-sensitive fastener as claimed in claim 1 wherein the fiber forming said flocked pile surface have a length of about 0.025 inches to about 0.040 inches.

6. A pressure-sensitive fastener as claimed in claim 1 wherein said permanent adhesive is an aqueous dispersed acrylic adhesive.

7. A pressure-sensitive fastener as claimed in claim 1 wherein said base material is selected from the group consisting of paper, cotton scrim, polyester cotton scrim, viscose rayon fabric, and plastic film.

8. A method of fastening two materials together comprising attaching a first pressure-sensitive fastener as claimed in claim 1 to one of said materials and a second pressure-sensitive fastener as claimed in claim 1 to the other of said materials and, contacting the flocked pile surface of said first fastener with the flocked pile surface of said second fastener.

9. A method as claimed in claim 8 wherein one of said materials is a carpet and the other of said materials is a floor.

10. A method of fastening two materials together comprising attaching a first pressure-sensitive fastener as claimed in claim 1 to one of said materials and a second pressure-sensitive fastener as claimed in claim 1 to the other of said materials and contacting the flocked pile surfaces of said first and second fasteners with the flocked pile surface of a third pressure-sensitive fastener as claimed in claim 1.

11. A method as claimed in claim 10 wherein said first and second materials are each carpeting.

12. A method for making a pressure-sensitive fastener having a discontinuous surface comprising coating a base material with a permanent adhesive, flocking the permanent adhesive-coated base material with pile fibers and heat-curing the permanent adhesive to secure the pile fibers to the base material, spray coating the cured flock-coated base material with an aqueous pressure-sensitive adhesive, and drying the spray-coated cured flock material.

13. A method as claimed in claim 12 wherein the flock forming said flocked pile surface is at least one flock selected from the group consisting of cotton flock, polyester flock, and viscose rayon flock.

14. A method as claimed in claim 12 wherein said aqueous pressure-sensitive adhesive is an aqueous dispersed pressure-sensitive acrylic adhesive.

15. A method as claimed in claim 12 wherein said permanent adhesive is an aqueous dispersed acrylic adhesive.

16. A method as claimed in claim 12 wherein said base material is selected from the group consisting of paper, cotton scrim, polyester cotton scrim, viscose rayon fabric, and plastic film.

17. A method as claimed in claim 12 wherein the fibers forming said flocked pile surface have a length of about 0.025 inches to about 0.040 inches.

18. A method as claimed in claim 12 wherein the fibers forming said flocked pile surface have a thickness of about 2 to 5 denier.

19. A method as claimed in claim 12 wherein said curing of the permanent adhesive is at a temperature of about 250° F. to about 325° F. for about 1 minute to about 4 minutes.

20. A method as claimed in claim 12 wherein said drying of the pressure-sensitive adhesive is at a temperature of about 225° F. to about 275° F. for about 0.5 minutes to about 2 minutes.

* * * * *